United States Patent
Temirbulatov

(10) Patent No.: US 11,285,666 B2
(45) Date of Patent: Mar. 29, 2022

(54) ROTARY PISTON EXTRUDER HEAD FOR 3D PRINTER

(71) Applicant: Marat Sagimbekovich Temirbulatov, Taraz (KZ)

(72) Inventor: Marat Sagimbekovich Temirbulatov, Taraz (KZ)

( * ) Notice: Subject to any disclaimer, the term of this patent is extended or adjusted under 35 U.S.C. 154(b) by 95 days.

(21) Appl. No.: 16/647,058

(22) PCT Filed: Nov. 23, 2018

(86) PCT No.: PCT/KZ2018/000018
§ 371 (c)(1),
(2) Date: Mar. 13, 2020

(87) PCT Pub. No.: WO2019/112403
PCT Pub. Date: Jun. 13, 2019

(65) Prior Publication Data
US 2020/0262144 A1  Aug. 20, 2020

(30) Foreign Application Priority Data

Dec. 5, 2017 (KZ) .................... 2017/1135.1

(51) Int. Cl.
*B29C 64/209* (2017.01)
*B33Y 30/00* (2015.01)

(52) U.S. Cl.
CPC .......... *B29C 64/209* (2017.08); *B33Y 30/00* (2014.12)

(58) Field of Classification Search
CPC ... B29C 64/209; B29C 64/118; B29C 64/255; B29C 48/365; B29C 48/33; B29C 48/361; B29C 48/47
See application file for complete search history.

(56) References Cited

U.S. PATENT DOCUMENTS

| 3,669,604 A | * | 6/1972 | Nebel ................... B29C 48/845 |
| | | | 425/379.1 |
| 5,121,329 A | | 6/1992 | Crump |
| 5,340,433 A | | 8/1994 | Crump |
| 5,738,817 A | | 4/1998 | Danforth et al. |

(Continued)

FOREIGN PATENT DOCUMENTS

CN    205272603 U    6/2016
WO    2018115467 A1   6/2018

*Primary Examiner* — Joseph S Del Sole
*Assistant Examiner* — Mohamed K Ahmed Ali

(57) ABSTRACT

The invention relates to the field of 3D printing, particularly to the extrusion method (Material Extrusion), i.e., the layer-by-layer deposition of a molten building material through an extruder head (an extruder). The present device allows for using a wide range of materials when printing, such as liquids, pastes, and melts (including metals), as well as for using pre-treated secondary raw materials. An extruder has, within a single housing, a loading chamber and a removable working chamber having a three-sided rotor (piston) moving therein and an eccentric drive shaft, as well as an extruder tip connected to the housing, said tip having a removable nozzle on its end, a built-in heat sensor, and a built-in heating element. At least one heating element and heat sensor are disposed within the housing. The extruder is disposed on a mounting frame having a drive motor, and said frame fastens to a moving platform of a 3D printer.

3 Claims, 4 Drawing Sheets

(56) References Cited

U.S. PATENT DOCUMENTS

2001/0045678 A1    11/2001   Kubo et al.
2008/0213419 A1     9/2008   Skubic et al.
2020/0361149 A1*   11/2020   Arao ...................... B33Y 10/00

* cited by examiner

ROTARY PISTON EXTRUDER HEAD FOR 3D PRINTER

The invention relates to the field of 3D printing, additive technologies (Additive Manufacturing) which is a general name referring to technologies for creating objects based on the data of a digital model (CAD models) using layer-by-layer addition of material, and particularly to the extrusion method (Material Extrusion), that is layer-by-layer deposition of a molten building material through an extruder.

Prior art technical solutions are known, consisting in the fact that the extruder head (Extruder) for a 3D printer extrudes to a base platform in XY plane drops of work material, which, after solidifying, forms layers of a future object according to a CAD model prepared beforehand. Afterwards, the extruder makes one step along the axis Z, which is perpendicular to XY plane, and the building process is repeated until the model is fully built.

The technology of 3D printing is known, in particular, from descriptions of the following U.S. patents:

U.S. Pat. No. 5,121,329, (Stratasys, Inc) published: Jun. 9, 1992—"Apparatus and method for creating three-dimensional objects"

U.S. Pat. No. 5,340,433, (Stratasys, Inc) published: Aug. 23, 1994—"Modeling apparatus for three-dimensional objects";

U.S. Pat. No. 5,738,817, (Rutgers, The State University) published: Apr. 14, 1998—"Solid freeform fabrication methods"

The mentioned patents describe a technology of 3D printing, as well as an actuation device, in particular an extruder head (an extruder) using thermoplastics or composite materials comprising various additives, yet based on thermoplastics and manufactured in the form of a flexible strand. The strand (filament) is supplied to the extruder, where it is heated up to a liquid state and extruded through a nozzle of the extruder.

The disadvantage of such solution is a limitation in regard to the speed of material extrusion, a limitation in regard to the materials being used comprising only thermoplastics and composites based thereon and only in the form of a strand of a certain diameter.

CN 205272603, (Nanjing Baichuan Xingyuan Laser Tech CO LTD) published: Jun. 1, 2016, «Screw rod advancing mechanism of 3D print pen ink»

In this patent a syringe type extruder head (an extruder) having a direct drive is mentioned. Extruders of such type work with liquid, jelly-like, paste-like materials such as, for instance, bioink, ceramic clay, silicone etc.

The main disadvantage of such solution is controlling the volume of extrusion by applying pressure to the whole mass. It is efficient for extruders of small volume, but with increasing volumes requirements for the driving mechanism step up, which makes the extruder more cumbersome, as well as increases the time needed for starting and stopping the extrusion.

A device is also known as "Viscosity pump for extrusion-based deposition systems", US20080213419, (Stratasys, Inc) published: Sep. 4, 2008, "Viscosity pump for extrusion-based deposition systems".

In this extruder the main working element is a screw type positive displacement pump in which the molten material is moved along the screw axis in the chamber defined by helical grooves and the housing surface, and is extruded through a nozzle.

The disadvantages of the known technical solution are the complexity of the structure, limitations regarding the materials being used, in this case thermoplastics in the form of a strand.

The task to be solved by the claimed invention entails broadening the extruder possibilities of using work materials in printing by means of an extruder. For example, when printing with thermoplastics using raw materials (granules), from which they are made, it is possible to use recycled materials, previously mechanically grounded up to the required particle size, or to print using paste-like materials composed of a binding material and a bulky material with a subsequent heat treatment, thus getting an opportunity to build with materials that have not been used before in the extrusion method of printing.

The mentioned task is solved by a rotary piston extruder head for 3D printer (an extruder) characterized by the fact that a loading chamber and a working chamber of a special profile in the form of an epitrochoid with a rotor (piston) moving therein are located within a single housing.

An eccentric shaft with a sliding cone fit is located at the centre of the working chamber, with a rotor mounted on its eccentric.

A three-sided rotor (piston) of a triangular shape having arc-shaped sides and a central fitment hole on one of butt ends of which an internal gear is located, the axis of the internal gear coinciding with the axis of the fitment hole.

A hermetic front cover of the working chamber has a stationary gear, the axis of which coincides with the axis of the eccentric shaft.

A hermetic back cover has an opening for the eccentric shaft and an area for fastening to the mounting frame.

The mounting frame is provided for mounting the extruder and a drive motor, as well as for fastening to a moving platform of a printer.

An extruder tip is connected to the housing and has a removable replaceable nozzle at an opposite end, as well as a built-in heat sensor and a built-in heating element.

The loading chamber, the working chamber and the extruder tip are connected by a flow channel passing therethrough and displaced from the centre of the eccentric shaft at a certain distance in the direction of the rotor motion during extrusion.

The working chamber is removable and can be made of different materials, and it is installed in a grooved cavity and fixed with a front cover.

At least one heating element and a heat sensor are disposed within the housing.

The housing can be made of any suitable materials.

The working chamber can be made directly within the housing.

The rotor apexes may have radial seals in the form of plates or rollers or in a different way.

The areas of connection between the covers and the housing, and the drive shaft are sealed in one of the known ways.

The drive motor can be equipped with a reduction gearbox and connected to the eccentric shaft by means of a clutch or in a different way.

The working chamber and the loading chamber may have an additional channel to return the excess material to the loading chamber.

The work material is supplied directly to the loading chamber in the form of bulk materials, liquids, pastes or melts. For this purpose there can be used additional attachments secured atop the loading chamber in the form of a funnel or, for instance, a cylinder having a spring-loaded piston, or a fitting having a pipe for supplying liquids, or a "filling station" installed on a printing device (printer) and periodically supplying the melt to the loading chamber of the extruder.

The technical result of the claimed invention consists in broadening printing possibilities, due to a rotary piston extruder head (extruder) for 3D printer, a wide range of materials used in the extrusion method of building, as well as enhancing printing, for instance, with the use of metals melts and their alloys or other materials that have not been used before.

The invention is explained by the drawings which do not cover and, moreover, do not limit the entire protection scope of this technical solution, being merely illustrative materials:

Figure 1:
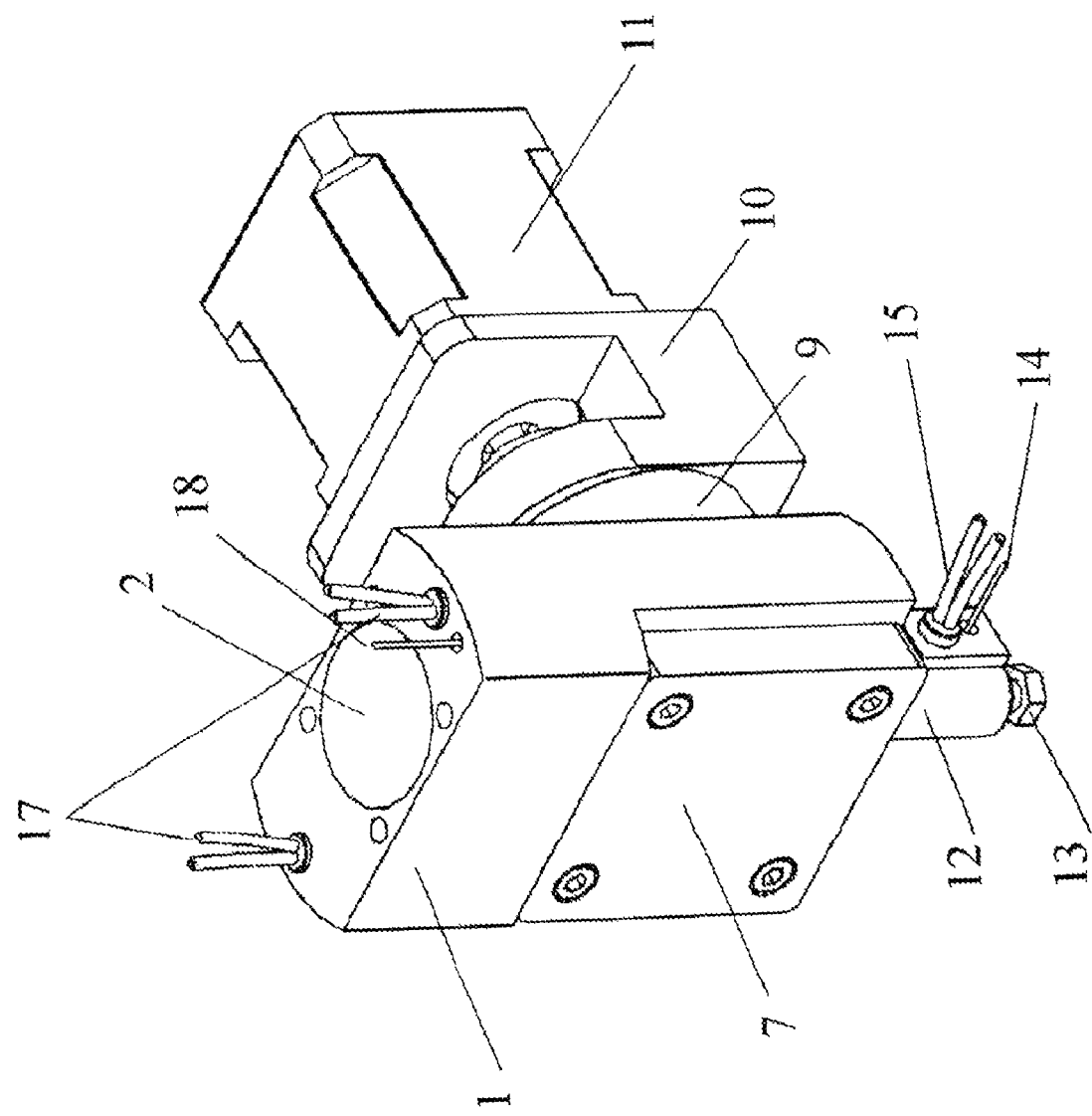
FIG. 1 is a general perspective assembled view of an extruder, a frame and a drive motor.
Figure 2:
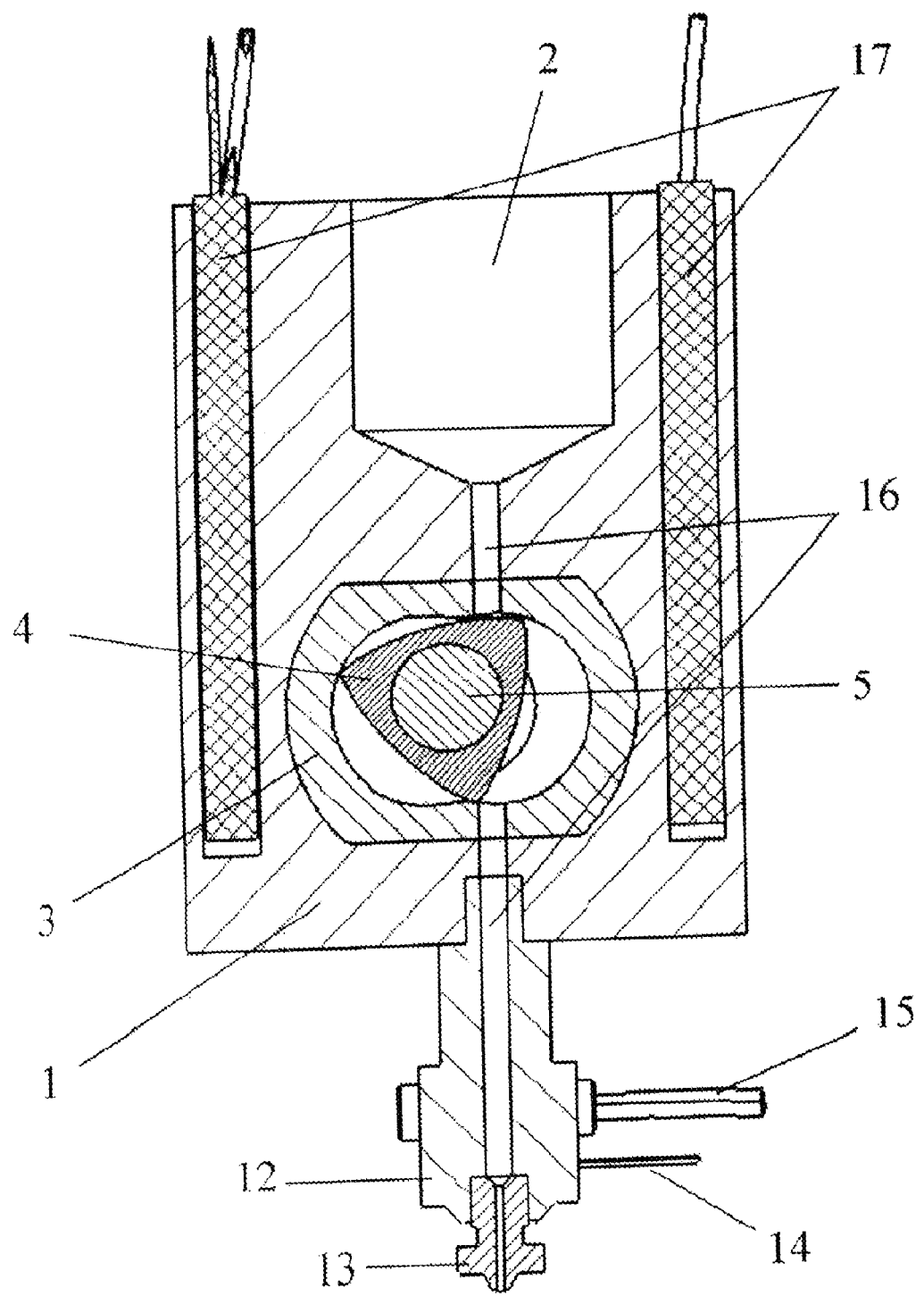
FIG. 2 is a section view of the extruder taken along the plane A-A.
Figure 3:
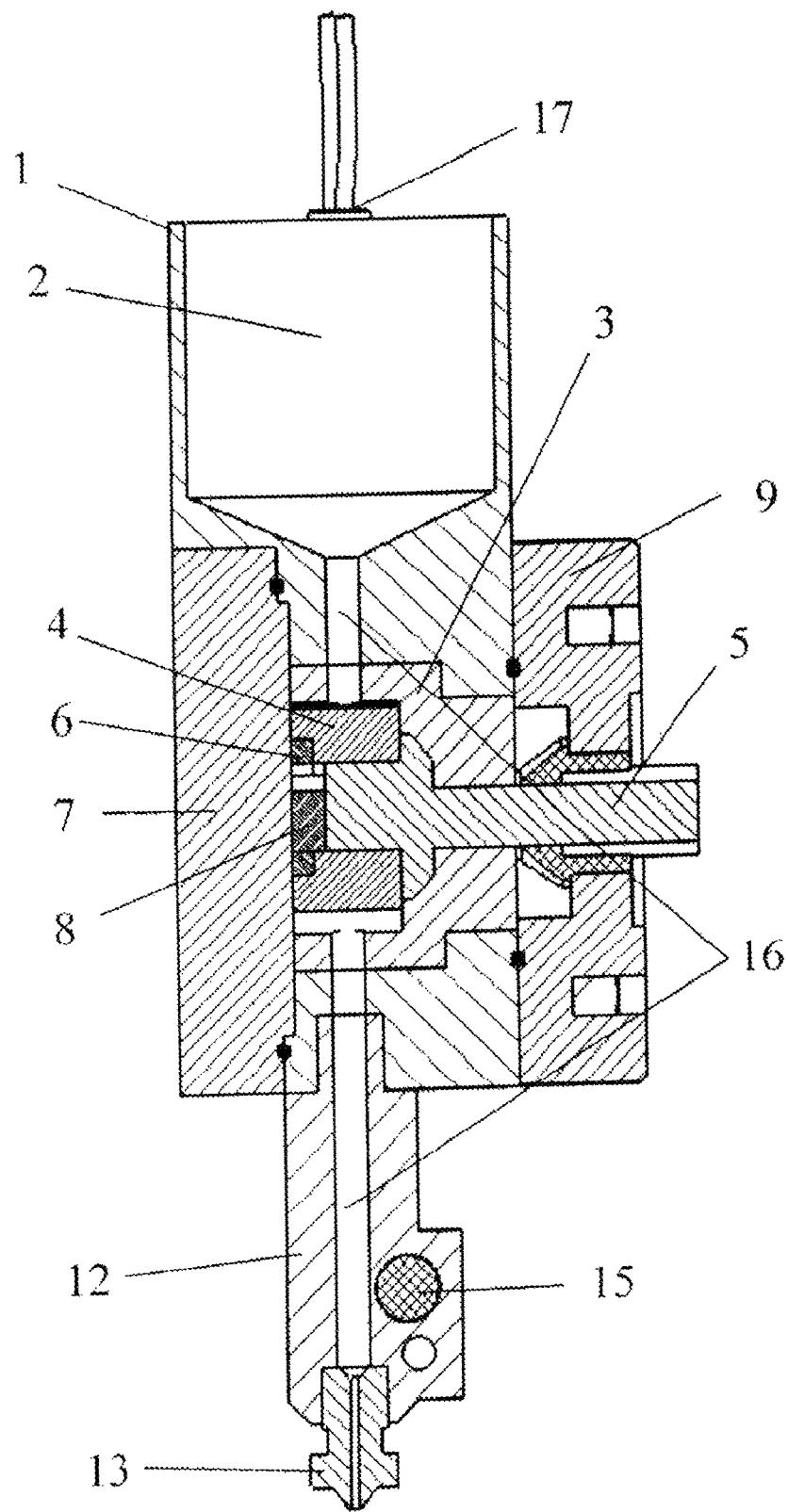
FIG. 3 is a section view of the extruder taken along the plane B-B.
Figure 4:
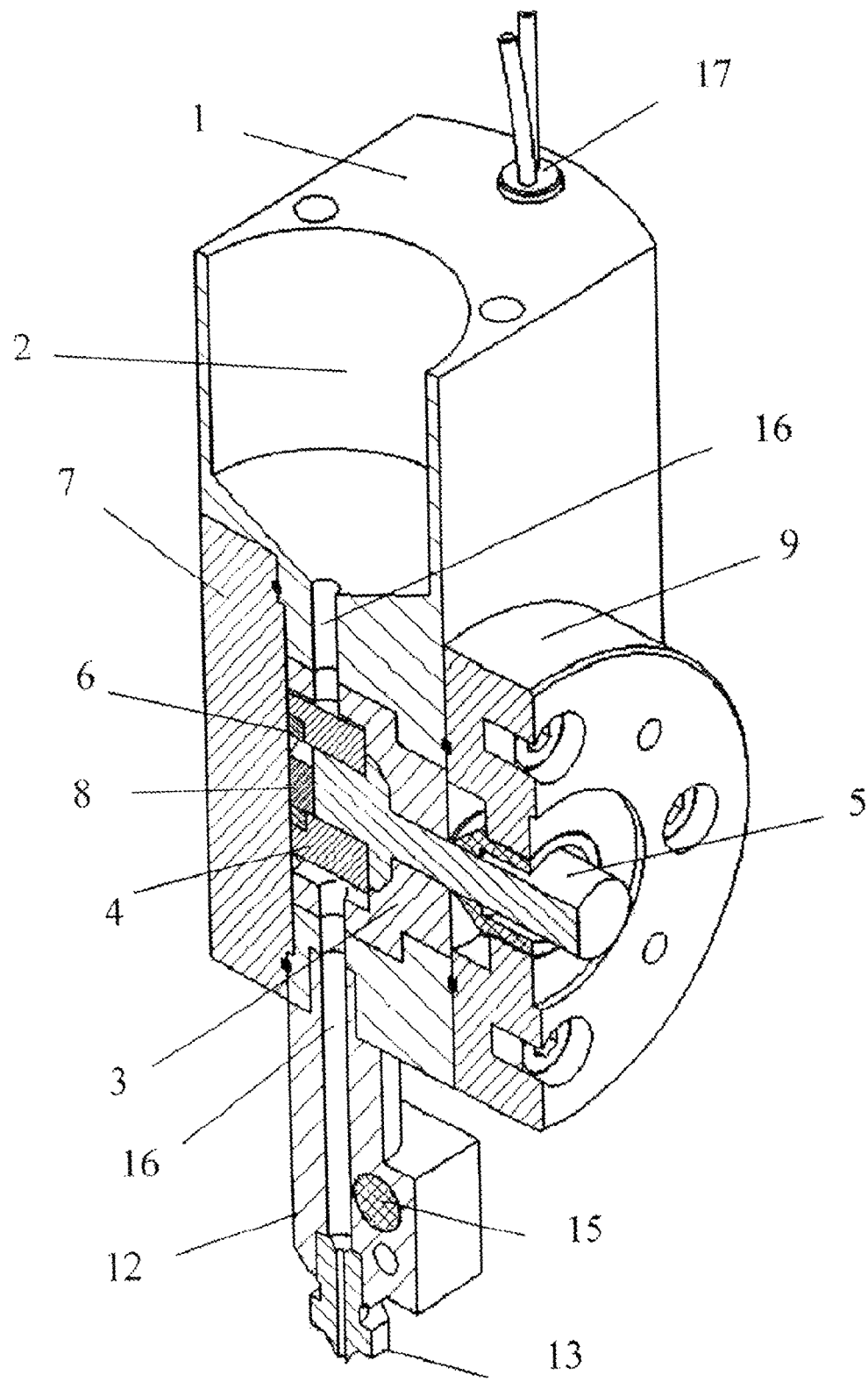
FIG. 4 is an isometric section view of the extruder taken along the plane B-B.

The claimed device consists of a housing (1) with heating elements (17) installed therein and being cartridge-type tubular electric heaters (cartridge heaters), a heat sensor (18) of a thermocouple type or a thermal resistor type and a loading chamber (2) provided in the upper part of the housing. An extruder tip (12) having a removable replaceable nozzle (13) and built-in heat sensor (14) and heating element (15) is mounted in the bottom part of the housing. The front cover (7) hermetically covers the removable working chamber (3) disposed in the housing. A hermetic back cover (9), a mounting frame (10) secured thereto and a drive motor (11) are disposed on the opposite side. A three-sided rotor (piston) (4) fitted on the eccentric of the eccentric shaft (5) is disposed in the working chamber (3) with the gear (6) on the butt end of the rotor engaging the stationary gear (8) located on the front cover (7). The loading chamber, the working chamber and the extruder tip are connected by a flow channel (16) passing therethrough.

The claimed device operates as follows: the work material is placed within the loading chamber (2), where it is subjected to heating, if necessary, up to the state of melt, by means of heating elements (17) with the temperature being controlled by a heat sensor (18). Afterwards during rotation of the eccentric shaft (5) the melt is sucked into the working chamber (3). During rotation of the eccentric shaft (5) the rotor (4) executes a planetary motion rotating together with the shaft and at the same time rotates about its own axis on the eccentric of the shaft (5) due to the fact that the gear (6) of the stationary gear (8) located on the front cover (7) revolves around it. When rotating, the rotor (4) creates a vacuum in the upper part of the working chamber (3) simultaneously creating a forward pressure in the bottom part of the working chamber (3). This property is determined by the structure of a special profile working chamber (3) of the three-sided rotor (4) and the displaced flow channel (16), which enables to properly separate the pressure line from the suction line and at the same time enables to suck the work material in on one side and extrude it at a constant pressure on the other side. The work material is extruded through the nozzle (13) via the flow channel (16) in the extruder tip (12) onto the surface being built. A heating element (15) and a heat sensor (14) are located in the extruder tip (12) to control and maintain a certain temperature of the work material being extruded.

One of the reasons why the working chamber is removable is possibility of printing using different materials. Example: in attempts to print with POS 61 tin-lead solder the working chamber made of yellow metal is replaced with a graphite one in order to prevent interaction between the solder and the material the working chamber consists of. The profile of the working chamber is made in the form of a twin-arc epitrochoid produced by the large internal gear revolving around the stationary small gear, the generating point is located outside the moving circle, here being the apex of the rotor. The parametric equation of the epitrochoid can be written as follows:

$$X_{(t)} R(\tfrac{1}{3} \cos 3t + C \cos t)$$

$$Y_{(t)} = R(\tfrac{1}{3} \sin 3t + C \sin t)$$

$$0 \le t \le 2Pi \tag{1}$$

where:
R is the radius of the revolving (generating) circle (of the large gear);
a is the generating radius (a distance from the rotor centre to its apex);
C is a ratio of radius (a) to radius (R), C=a/R
t is an angle of rotation of the generating circle relative to the abscissa axis (rotor rotation angle).

"Rotoporshnevye dvigateli" Beniovich V. S., page 81. Moscow, "Mashinostroenie" 1968.

Extruder tests were conducted on a desktop 3D printer from the wide range RepRap (3D printers with an open source code reprap.org), the electronics of which is controlled by Atmel AVR processor made on the basis of Arduino microcontroller (reprap.org/wiki/Arduino_Mega) with Marlin firmware (reprap.org/wiki/Marlin/ru).

The invention claimed is:
1. A rotary piston extruder head for 3D printer comprising:
    a housing with a loading chamber and a working chamber;
    at least one heating element and a heat sensor disposed within the housing;
    an extruder tip comprising a built-in heat sensor and a built-in heating element, connected at one end to the housing and having a removable replaceable nozzle at an opposite end,
characterized in that
    the working chamber having an epitrochoid profile is provided with a drive eccentric shaft located therein with an axis coinciding with the working chamber symmetry axis, and a three-sided rotor with an internal gear is arranged on the eccentric of the shaft and is configured to rotate;
    the working chamber is connected to the loading chamber and the extruder tip by flow channels;
    the working chamber is removable:
and further comprising:
    a hermetic front cover of the working chamber having a stationary gear on the internal surface, the axis of which coincides with the axis of the eccentric shaft and which engages the gear of the rotor;
    a hermetic back cover with an opening for the end portion of the eccentric shaft.
2. The rotary piston extruder head for 3D printer according to claim 1, wherein the eccentric drive shaft has a sliding cone fit in the working chamber.

3. The rotary piston extruder head for 3D printer according to claim 1, wherein the edges of the rotor comprise radial seals.

\* \* \* \* \*